United States Patent
Lehmann et al.

(10) Patent No.: US 12,031,249 B2
(45) Date of Patent: Jul. 9, 2024

(54) METHOD FOR PRODUCING A NEEDLE PUNCH VELOUR CARPET

(71) Applicant: Adler Pelzer Holding GMBH, Hagen (DE)

(72) Inventors: Ralf Lehmann, Köningswartha (DE); Jochen Erhard Glass, Bad Elster (DE); Matthias Dickert, Witten (DE); Volkmar Schulze, Schierling (DE)

(73) Assignee: Adler Pelzer Holding GMBH (DE)

( * ) Notice: Subject to any disclaimer, the term of this patent is extended or adjusted under 35 U.S.C. 154(b) by 653 days.

(21) Appl. No.: 16/612,989

(22) PCT Filed: May 15, 2018

(86) PCT No.: PCT/EP2018/062579
§ 371 (c)(1),
(2) Date: Nov. 12, 2019

(87) PCT Pub. No.: WO2018/210852
PCT Pub. Date: Nov. 22, 2018

(65) Prior Publication Data
US 2020/0173073 A1    Jun. 4, 2020

(30) Foreign Application Priority Data
May 16, 2017    (DE) .......................... 102017208200.3

(51) Int. Cl.
*D04H 1/46* (2012.01)
*B60N 3/04* (2006.01)
*D04H 1/485* (2012.01)
*D05C 17/02* (2006.01)
*D06M 13/00* (2006.01)
*D06M 15/00* (2006.01)

(52) U.S. Cl.
CPC .............. *D04H 1/46* (2013.01); *D04H 1/485* (2013.01); *D05C 17/026* (2013.01); *D06M 13/00* (2013.01); *D06M 15/00* (2013.01); *B60N 3/042* (2013.01); *B60N 3/048* (2013.01); *D06M 2200/35* (2013.01)

(58) Field of Classification Search
None
See application file for complete search history.

(56) References Cited

U.S. PATENT DOCUMENTS

| 2,303,202 | A |  | 11/1942 | Faris et al. |
| 5,874,148 | A | * | 2/1999 | Hough ................. D06N 7/0073 |
|  |  |  |  | 442/84 |
| 2006/0105664 | A1 | * | 5/2006 | Zafiroglu ................ B32B 27/12 |
|  |  |  |  | 442/327 |
| 2008/0287020 | A1 |  | 11/2008 | Rudat |
| 2011/0009553 | A1 | * | 1/2011 | Heller ..................... C08L 29/04 |
|  |  |  |  | 524/506 |
| 2011/0083792 | A1 | * | 4/2011 | Vollmert ................ D04H 13/00 |
|  |  |  |  | 156/72 |

FOREIGN PATENT DOCUMENTS

| CN | 101046062 A | 10/2007 |
| DE | 1 560 664 A1 | 5/1972 |
| DE | 39 04 526 A1 | 8/1990 |
| DE | 44 09 771 A1 | 10/1994 |
| DE | 692 03 659 T2 | 2/1996 |
| DE | 20 2008 007 978 U1 | 11/2008 |
| DE | 10 2008 026 968 A1 | 12/2009 |
| DE | 10 2015 103 116 A1 | 9/2015 |
| EP | 0 013 902 A1 | 8/1980 |
| EP | 0 048 609 A1 | 3/1982 |
| JP | 59101362 A | 6/1984 |
| JP | 08-2303 H | 1/1996 |
| JP | 10-273860 A | 10/1998 |
| JP | 2005-261798 A | 9/2005 |
| JP | 2016-60986 A | 4/2016 |
| TW | 200420795 A | 10/2004 |
| WO | 2007/068763 A1 | 6/2007 |
| WO | 2009/147051 A1 | 12/2009 |
| WO | 2017/042076 A1 | 3/2017 |

OTHER PUBLICATIONS

Yin,J et al., Progress on polyhydroxyalkanoates (PHA); Chinese Journal of Biotechnoloy, Jun. 25, 2016, 32(6): pp. 726-737.
International Search Report for International Application No. PCT/EP2018/062579 mailed on Aug. 1, 2018.
Machine translation of Japanese Notification of Reasons for Refusal of Patent Application 2019-563062.

* cited by examiner

*Primary Examiner* — Shawn Mckinnon
(74) *Attorney, Agent, or Firm* — Seth L. Hudson; Maynard Nexsen PC

(57) ABSTRACT

The present invention relates to a method for producing a needle punch carpet having a velour-type and more wear-resistant surface which has advantageous characteristics over conventional flat needle nonwovens and dilour carpets.

6 Claims, No Drawings

METHOD FOR PRODUCING A NEEDLE PUNCH VELOUR CARPET

FIELD OF THE INVENTION

The present invention relates to a process for producing a needle punch velour carpet having a more wear-resistant surface, which has advantageous properties over conventional carpets for motor vehicle interior spaces and trunks.

BACKGROUND OF THE INVENTION

Usually, the wearing surface of such sound-insulating components, which consist of yarns or fibers and optionally a support, faces towards the passenger. The fibers may usually be either natural (animal: new wool, vegetable: cotton or jute) or synthetic (polyamide, polyester, polypropylene). Mixed yarns are also possible, such as polyamide and new wool.

In commercially available motor vehicles, different forms of carpets are found, especially tufting, dilour and flat-needle punched carpets. For tufting carpets, PA6.6, PAS, PP, rPA and rPET are predominantly employed, and for the dilour and flat-needle punched carpets, PET, PET/PP, PP, PA/PET and rPET are predominantly employed.

The term "tufting" designates a sewing-knitting method, which is a technology for the production of three-dimensional textile sheets. It is the process most frequently employed worldwide for preparing carpets or valuable automobile interior and trunk trims. The method is suitable for the production of both loop fabrics and velour fabrics. Tufting works on the principle of a sewing machine. Needles insert the so-called pile yarn into a base material (woven or non-woven fabric), the so-called primary backing or support. A simultaneous movement of the needles takes place over the entire width.

The needles stitch through the base material; before the needles are running back again, the inserted pile yarn is held by loopers. This produces loops (pile knots) on the top side of the tufting fabric.

In this way, a so-called loop-pile carpet is obtained. If the loops are cut open with a knife, a velour carpet (cut-pile carpet) is formed. Frequently, the knife is already attached to the looper, so that the holding and cutting of the pile is done in one operation.

In order to hold the stitched pile yarn tight, a secondary backing or latex layer must be applied. This process is referred to as lamination or integration.

The tufting support in the tufting grades is mostly made of PET/PP, PET/coPET, or PET/PA. For the yarn/fiber integration, there are predominantly employed EVA for the tufting carpets and SBR latex or acrylate for the dilour and flat-needle punched carpets. The coating, mostly as an adhesive layer for backing cloths, but also for stiffening, includes predominantly PE or PP, optionally also a heavy layer based on EVA, PE, PP, EPDM. Also, PE/PA/PE sheets are employed today.

In addition, a "simpler" method is known in the prior art, which produces similar carpets without a pile yarn inserted into the primary backing from outside.

In contrast to the above mentioned tufting process, in which continuous filaments are employed as fiber raw materials, so-called staple fibers, i.e., chopped fibers with a length of 30 to 70 mm, are used in the needle punch process. In a first operation, a flat-needle punched fabric is prepared from such staple fibers. Thus, the staple fibers are pre-opened, mixed, and supplied to a card. The card web taken off from the swift of the card is doubled several times by using a cross lapper until the desired weight per unit area is reached, and bonded on one or several needle looms. One or more so-called needle boards are mounted in a needle loom, on which the needles are pinned over the entire fabric width (CD) and in the fabric machine direction (MD) in a specified arrangement. The needles pierce through the doubled card web, wherein the fibers, which were parallel up to then, are deflected from the planar orientation. A large number of deflecting and crossing points of the staple fibers are formed. The mechanical entanglement, crossing, interlooping and respectively friction at such points of contact of the individual fibers causes a mechanical bonding between the staple fibers, which is the main determinant of the mechanical properties of the needle punched fabric. During this needling process, the needles penetrate the whole thickness of the web and reappear on the opposite side. In order to avoid damage to the needles when piercing through the fabric, they enter a so-called perforated plate with corresponding recesses on the other side. Depending on the desired product, the number of needle looms, the number of needles pinned thereon, their mutual arrangement, the type of needles, the needling direction (from the top or from the bottom) and other parameters are varied and combined. At the end of the process, a velourized needle punched fabric is obtained.

For the velourization, needles pierce through one side of a flat-needle punched fabric and pull fiber loops between the bristles of a brush belt that lies below the fibrous web. In this process, the needles dive into the brush belt, which holds back the pricked-out fibers when the needles are moving back. Thus, the desired velour appearance is formed on the brush side. The needles employed may be needles having small barbs on their sides, so-called crown needles, or needles having fork-like ends, so-called fork needles.

After the needling process, the velour is separated from the running brush belt by a pair of rollers. The degree of fiber density on the visible side is determined by the number of stitches per unit area, the penetration depth of the needles into the fibrous web, and the fiber fineness.

This is followed by the bonding of the fibers from the piercing side using a binder based on synthetic rubber or acrylate by different application methods. Further, plastic sheets, non-wovens, adhesives (hot melt adhesives), thermoplastics (mainly PE) are employed, as well as the so-called thermobonding (Klieverik; EP 1 598 476 B1).

For latex-free bonding, binding fibers or thermoplastic dispersions are employed. The fiber widths are then usually from 3.3 to 17 dtex.

As described above, no additional pile yarn is inserted from outside into the non-woven produced, the so-called primary backing. In this method, the shape of a velour carpet is obtained by the needles piercing individual fibers from the fibrous web into the brush belt.

This method yields a velour carpet in which the starting fabric is a flat-needle punched fabric. As described above, the flat-needle punched fabric obtains its velour (dilour) character by needling it into a brush belt in a second operation.

In the prior art, methods for preparing velour carpets are known, see, among others, DE 44 09 771 A1, EP 0 013 902 A1, and DE 10 2008 026 968 A1.

When such carpets are employed, especially in the passenger compartment in the floor trim, the focus is on the wear performance, in this case the wear resistance in the "Taber test" (abrasion resistance). The surface (color change according to gray standard, quality of the fiber fleece) and the weight loss in different cycles are evaluated.

Using the Taber abraser, the abrasion resistance of a wide variety of materials can be determined. As an internationally recognized test method, the Taber abraser test is mentioned in several national and international standards (ISO 9352, ASTM D 1044, DIN EN-Norm 438-6). The abrasive load is generated by two friction rollers that are pressed onto the rotating specimen with an established force. Differential weighing to determine the abraded proportion of the specimen is usually used for the evaluation. It is also possible to determine the wear depth as an alternative to the loss of weight method.

This wear resistance is essentially influenced by the processes employed in the three stages of production (fiber production, preparation of the needle-punched velour, component production) and their parameters. With such process parameters, the abrasion properties of the respective intermediate or final product are determined.

These are classified into:
a) fiber (surface properties, mechanical, geometrical, physico-chemical properties)
b) needle-punched velour/body (binding, fiber mix, pile height, pile density)
c) shaped carpet component (layer structure, degree of draw, pile height, pile density).

In practice, however, it is found that this wear performance does not meet the targets demanded today by the automobile manufacturers, or rather rarely so.

BRIEF SUMMARY OF THE INVENTION

It is the object of the present invention to improve the prior art processes, especially the process for preparing velour carpets as explained above, in such terms that a needle punch velour carpet can be prepared, in particular, in one operation when a "flat-needle punched" fabric is produced, which has not been possible by the previously known methods of the prior art. When a wear-resistance increasing coating is simultaneously applied to the so-called "pile layer", i.e., the exposed fibers, this should be possible.

DETAILED DESCRIPTION OF HE INVENTION

In particular, the object of the invention is to simplify the production process for preparing a needle-punch carpet, or to make it more efficient and less expensive, by using only one needling unit containing needles for the needling of the bulky unstable sheet received from a carding belt of a carding machine.

The object of the present invention is achieved by a process for producing a needle punch carpet having a velourized and more wear-resistant surface, comprising the following steps:

In the last step in the production of a flat-needled web, the piercing is effected in such a way that the stitch-out side of the carpet
a.) has a penetration depth of from 2 to 13 mm,
b.) the needle design is such that needle types can be used in with notches being arranged in different heights and numbers,
c.) the needle density is at least 9000/m$^2$
d.) the fiber working weight is from 240 to 600 g/m$^2$,
e.) only one single needling unit is employed and
f.) the stitch density is from 200 to 750 stitches/cm$^2$, said carpet is velourized, wherein the carpet, before being subjected to a drying/cross-linking process, is coated with a wax/polymer dispersion on the stitch-out side thereof.

The needling can be effected with different needle types in which the notches are arranged laterally in different heights and numbers (crown needles), or having a notch at the tip of the needle (fork needles).

The fiber density can be increased even further by employing binding fibers (BiCo fibers).

Further, it is preferred that the back side of the web is sprayed with water and/or a commercially available dispersion or dried only by the use of binding fibers, especially without tension. This fixes the standing condition of the fibers, and the fiber density is increased. At the same time, the fibers are integrated.

According to the invention, after the needling, at the bonding using a binder based on synthetic rubber or acrylate, the coating agent is foamed on the pile/carpet side, preferably by a padding method. The application of the coating agent can be applied, for example, by a spraying method. The coating agent may be a a wax/silicone oil emulsion, or a modified fatty acid ester. The coating agent is applied to a tufting carpet, or a standard dilour carpet.

Irrespective of the kind of fiber bonding, the application of the coating agent must be done always before the carpet is subjected to the drying/cross-linking process.

It is further preferred that the stitch-out side or pile side of the web is brushed against the grain to erect the fibers, and protruding fibers are shorn off. This again additionally fixes the standing condition of the fibers, and the surface of the needle-punched velour carpet is clearly smoothed, which is important, in particular, for those applications in which the stitch-out side or pile side is the visible side of the needle-punched velour carpet.

Preferably, a mixture of pile yarns is employed that comprises fibers of polypropylene (PP), polyester (PET), polyamide (PA), or mixtures thereof. These may have a recycling fraction; especially for PET fibers, the recycling proportion may also be 100%.

Depending on the application, the respective advantage of the fibers and/or fiber mixtures resides in the price, light fastness, or in the wear and cleaning performance.

Further, different fiber titers are employed, especially fibers whose fineness is within a range of from 3.3 to 17 dtex. The selection of the fiber mix depends on the later application of the needle-punched web. When the fiber working weights are low (300 to 400 g/m$^2$), fibers with 6.7 dtex should be employed in order to reach a web having a sufficient density.

The respective advantage resides in the higher density for lower fiber working weights [for a dilour, about 10% higher fiber density is required; this means that a dilour having a final weight of 500 g/m$^2$ has a fiber working weight of 550 g/m$^2$ when the flat-needle punched web is prepared], the improved cleaning ability, and the improvement of the abrasion performance.

Only when the mixture of fibers is homogeneous, the plaiting by the cross lapper is exact and the drawing of the needle machine is adapted to the product, then the flat-needle punched fabric can be said to have a good quality, or the flat-needle punched web can be said to be good.

In order to achieve an isotropic firmness property, the web can be slightly stuffed already after the carding, and is stretched before or after the needling to reorient the fibers, so that a lengthwise-to-crosswise strength ratio of 1 to 1.2 or 1 to 1.4 is obtained.

It contributes to a higher fiber transport during the needling, and to better stretching properties in the shaping process.

The process according to the invention shall be explained by way of example.

EXAMPLES

A customary 370 g/m² PET fiber carpet with 80 g/m² with a customary acrylate binder with a velourized surface and coating agent was prepared by the above-described process.

A mixture of wax and polymer dispersion was applied as the coating agent on the stitch-out or pile side by means of a padding machine before the carpet entered the drying furnace; the wet application weight was 110 g/m².

For this coating, a mixture comprising the following ingredients was prepared:

| | |
|---|---|
| 79.44% by weight | water |
| 19.86% by weight | wax/polymer dispersion* |
| 0.70% by weight | soap |

*Tubicoat TAB from the CHT R. Beitlich GmbH, Tübingen, DE

The plant speed was 6 m/min, and the temperature in the drying furnace was 150° C.

In the following Table 1, the carpet obtained having a velourized and coated surface is compared to a flat-needle punched web of the prior art.

The arrows represent a comparison of the materials according to the invention with those of the prior art. Meanings (respectively based on similar pile weights):

| | | | |
|---|---|---|---|
| ⇒ | equally good | + | better |
| ⇑ | better | − | equal |
| ⇓ | worse | −− | worse |

As can be seen from this Table, the needle-punched velour carpet materials prepared by the process according to the invention have altogether more favorable properties than is the case with the materials of the prior art.

TABLE 1

| | Carpets with a velourized coated surface | Flat-needle punched web |
|---|---|---|
| Fine fiber | − ⇒ | − |
| Fiber density | − ⇒ | − |
| Standing condition of the fibers | +⇑ | −− |
| Abrasion | +⇑ | − |
| Cleaning | +⇑ | −− |
| Degree of drawing | +⇑ | −− |
| Streak formation | +⇑ | −− |
| Price | − ⇒ | − |

The surface rating according to the Taber test is one grade better for the needle-punch carpet with the velourized coated surface as compared to the flat-needle punched web, and the weight loss is 0.14 g.

| Testing conditions following DIN 53 754 | | | |
|---|---|---|---|
| according to PrA-014 | Cycles N | 1000 | |
| | number of revolutions n | 60 | min⁻¹ |
| | Load F | 2 × 1000 g | |

-continued

| Testing conditions following DIN 53 754 | | |
|---|---|---|
| Set points: | Abrasion wheel type | H18 |
| | Abrasion | ≤0.5 |

Since the emission behavior of components gets into the focus increasingly today, it was also examined:

The test results for fogging (PV 3015), odor C2 and C3 (PV 3900) and formaldehyde emission (PV 3929) were clearly below the limits for the carpets according to the invention.

Further, the carpet was tested in a so-called heel test. In this test, the abrasion behavior is tested for specified reciprocating movements of a heel (steel heel).

The results in the dry and wet test met the requirements of the targets determined in the testing protocols of the automobile manufacturers.

Also, when the process with the wax/polymer dispersion coating according to the invention was applied to a 560 g/m² PET fiber carpet with 80 g/m² acrylate bonding, this carpet showed significant differences in the wear performance as compared to a standard dilour carpet: weight loss 0.18 g, and a better score in the surface evaluation.

In the Examples, a significant improvement of the impression performance according to DIN ISO 3415 was also found.

The invention claimed is:

1. A process for producing a needle punch carpet having a velourized and more wear-resistant surface, comprising:
   providing a bulky unstable sheet, a needling unit containing needles, and a carding machine with a carding belt;
   needling the bulky unstable sheet, received from the carding belt of the carding machine, wherein the bulky unstable sheet is needled in the needling unit forming the carpet with a stitch-out side, characterized in that the stitch-out side of the carpet has a penetration depth of from 2 to 13 mm,
   wherein:
   a) a needle design of the needles in the needling unit is such that needle types can be used in which notches are arranged in different heights and numbers, wherein the needling unit is used for consolidation of the bulky unstable sheet;
   b) a needle density of the needles in the needling unit is at least 9000/m²;
   c) a fiber working weight of the carpet is from 240 to 600 g/m²;
   d) only one single needling unit is employed and used for the consolidation of the bulky unstable sheet;
   e) a stitch density of the carpet is from 200 to 750 stitches/cm²; and
   f) the stitch-out side is brushed against a grain to erect fibers, and protruding fibers are shorn off;
   wherein the carpet is velourized, and
   wherein the carpet, before being subjected to a drying/cross-linking process, is coated with a wax/polymer dispersion on the stitch-out side.

2. The process for producing a needle punch carpet having a velourized and more wear-resistant surface according to claim 1, further comprising applying a wax/silicone oil emulsion coating agent is applied to the carpet.

3. The process for producing a needle punch carpet having a velourized and more wear-resistant surface according to claim 1, further comprising applying a modified fatty acid ester coating agent to the carpet.

4. The process for producing a needle punch carpet having a velourized and more wear-resistant surface according to claim 1, further comprising applying a coating agent by a padding or spraying method.

5. The process for producing a needle punch carpet having a velourized and more wear-resistant surface according to claim 1, further comprising applying a coating agent to a tufting carpet.

6. The process for producing a needle punch carpet having a velourized and more wear-resistant surface according to claim 1, further comprising applying a coating agent to a standard dilour carpet.

\* \* \* \* \*